United States Patent Office 2,820,825
Patented Jan. 21, 1958

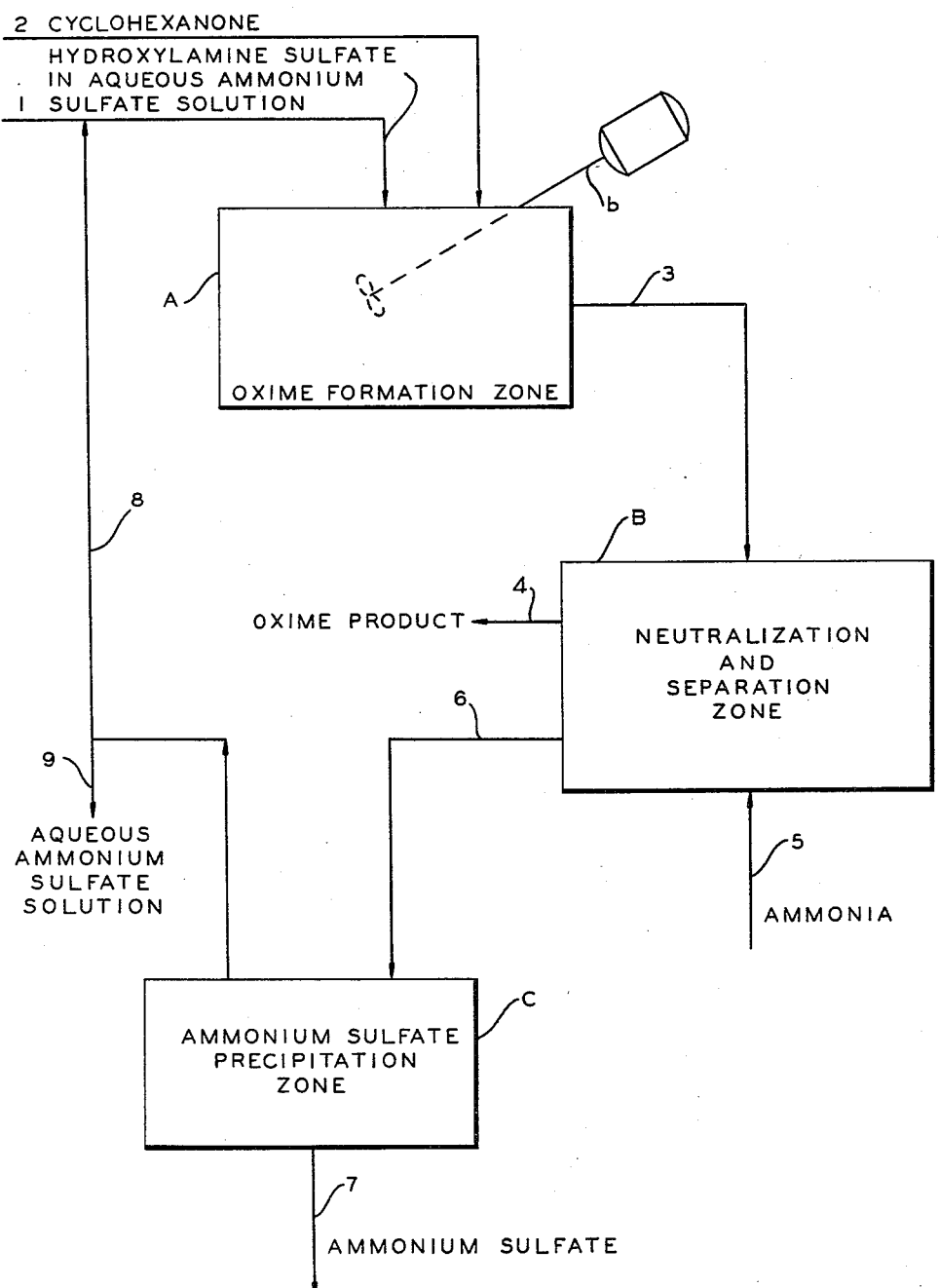

---

2,820,825

PRODUCTION OF OXIMES

John C. Hillyer and Joseph F. Wilson, Bartlesville, Okla., assignors to Phillips Petroleum Company, a corporation of Delaware Application October 7, 1955, Serial No. 539,137

7 Claims. (Cl. 260—566)

This invention relates to the production of oximes. In one aspect this invention relates to the production of oximes by reacting a ketone with hydroxylamine sulfate and/or hydroxylamine acid sulfate in the presence of ammonium sulfate and/or methylamine sulfate in sufficient concentration to facilitate efficient recovery of oxime product. In other aspect this invention relates to a method for production of oximes as described hereinabove, wherein, as a result of the salting out effect of a high regulated concentration of sulfate, molten oxime is efficiently separated as a product layer of high purity.

Various methods are known in the art for reacting ketones with hydroxylamine sulfate or hydroxylamine acid sulfate to form oximes, followed by neutralization and recovery of oxime product. Heretofore, it has been the practice to conduct the reaction in aqueous phase or in a relatively dilute ammonium sulfate solution. In this manner, however, various amounts of oxime product remain dissolved in the aqueous medium after the bulk of the oxime has been removed by filtration or other means and must be recovered in an additional step in order to obtain good product yield. Also, ammonium sulfate is present as a contaminant in the oxime product. Recovery of ammonium sulfate, from the aqueous medium, has been effected only in accordance with uneconomical methods such as evaporation.

This invention is concerned with a method whereby oxime product is recovered from a resulting reaction mixture of a process reaction, above described, in efficient and improved high yield.

An object of this invention is to provide for production of oximes by reacting a ketone with hydroxylamine sulfate and/or hydroxylamine acid sulfate and for efficient separation and recovery of oxime product from resulting reaction mixture. Another object is to provide a continuous process for reacting a ketone with hydroxylamine sulfate and/or hydroxylamine acid sulfate wherein oxime product is substantially completely separated from resulting reaction mixture as an upper molten layer and is withdrawn as product of high purity. Another object is to maintain a regulated high concentration of ammonium sulfate and/or methylamine sulfate in a ketone-hydroxylamine sulfate and/or hydroxylamine acid sulfate reaction mixture to form oximes, for efficiently salting out oxime product.

Other aspects and objects of this invention are apparent from a perusal of this disclosure, the drawings, and the appended claims.

In accordance with this invention, an oxime is produced and efficiently separated from resulting reaction mixture by reacting a ketone with hydroxylamine sulfate, or hydroxylamine acid sulfate, as desired, to form an oxime; neutralizing resulting reaction mixture with at least one of methylamine and ammonia whereby a corresponding sulfate is formed; separating oxime product in molten state from the resulting reaction mixture; introducing additional hydroxylamine sulfate and/or acid sulfate and ketone reactants into the reaction mixture to form additional oxime, and maintaining concentration of ammonium sulfate and/or methylamine sulfate in the said reaction mixture at a level sufficiently high to cause substantially complete salting out of high purity molten oxime product.

In the practice of one form of continuous process of this invention, employing an aqueous medium, aqueous phase is removed from the said reaction mixture and subjected to at least partial removal of sulfate therefrom, formed during neutralization of oxime sulfate, and is then recycled to the reaction zone together with fresh ketone and hydroxylamine sulfate, or acid sulfate, reactants, thereby maintaining at all times a regulated high concentration of sulfate in the oxime-forming zone whereby to effect efficient separation and recovery of molten oxime product.

In the practice of a now preferred form of the process of this invention, an alicyclic monoketone is admixed with a solution of about a stoichiometric amount of hydroxylamine sulfate in ammonium sulfate (aqueous) of a concentration of about 18 percent by weight of ammonium sulfate to saturation, which concentration depends upon the temperature of the solution which is to be employed in the reaction zone and in a mol ratio of ammonium sulfate to oxime product to be formed (based on theoretical yield) of at least 0.2:1. Higher ratios of ammonium sulfate to oxime product to be formed can be employed if desired.

The resulting admixture is agitated at a temperature below the fusion point of the oxime product to be formed until reaction is complete, preferably at about room temperature, followed by neutralization with gaseous ammonia. Neutralized reaction mixture is then heated to a temperature at least as high as the fusion temperature of the oxime, whereby molten oxime product is separated in high purity as an upper layer by virtue of the "salting out" effect of the ammonium sulfate present, and is recoverable in substantially complete yield. Residual aqueous medium (bottom layer) is subjected to partial removal of ammonium sulfate, preferably by cooling back to reaction temperature, to remove that ammonium sulfate formed during neutralization and then is recycled to the oxime-forming zone with additional ketone and hydroxylamine sulfate reactants to form additional oxime while maintaining the desired sulfate concentration therein, as described hereinabove, to provide at all times for substantially complete separation and recovery of oxime product as a top molten layer of high purity.

In carrying out one embodiment of the above-described now preferred form, hydroxylamine sulfate is dissolved at room temperature or slightly above in an aqueous solution of ammonium sulfate containing at least 28 percent by weight amonium sulfate. A stoichiometric equivalent or slightly less of cyclohexanone is added, and the mixture is agitated at room temperature or at a temperature sufficiently above room temperature to keep all the reaction products in solution. The agitation is continued until the two immiscible phases disappear with formation of a single homogeneous phase, indicating that the ketone and hydroxylamine sulfate have reacted completely to form the soluble cyclohexanone oxime sulfate. A stoichiometric amount of $NH_3$ is then added in order to liberate the cyclohexanone oxime from its salt, ammonium sulfate and water being formed in the process. Addition of $NH_3$ to a pH of 3.4–3.5 indicates that sufficient $NH_3$ has been added. An excess can be added, but is uneconomical, and in a continuous process is undesirable, since it will later react with the hydroxylamine sulfate. The solution is then heated to at least 70° C., at which temperature the cyclohexanone oxime forms a molten layer overlying an aqueous layer. The molten oxime layer can be withdrawn, and either used immediately for its intended purpose without further purification, or stored for further use. Yields up to 98 percent and higher are obtained. The product has a purity of 99+ percent. After withdrawal of the molten oxime layer, the aqueous layer is cooled to room temperature and the ammonium sulfate which precipitates is removed by filtration.

Although we have defined the preferred form of our process as that utilizing ammonia or ammonium hydroxide as the neutralizing agent, we have found it advantageous to employ methylamine. Thus, the sulfate present in the aqueous medium will be ammonium sulfate or methylamine sulfate or a mixture, if a mixture of neutralizing agents is employed. It is important to regulate the concentration of sulfate in the oxime-forming zone at all times so as to maintain an optimum high concentration of sulfate sufficient to effect the desired salting out. Suitable sulfate concentrations are illustrated hereinafter with reference to the examples. Generally, however, when employing ammonium sulfate in accordance with this invention, the concentration of ammonium sulfate in the aqueous medium is in the range of from about 18 weight percent to saturation concentration at reaction temperature, and the minimum amount of ammonium sulfate therein in ratio to oxime product should be at least 0.2:1 on a mol basis. Higher ratios of ammonium sulfate to oxime product can be employed if desired.

Ammonium sulfate recovered by cooling the aqueous reaction medium is of high purity, substantially all oxime product being separated into the upper oxime product layer. The precipitation of ammonium sulfate by cooling can be controlled by the temperature to which the solution is cooled and the length of time during which the solution is allowed to stand at that temperature. Such cooling conditions are known to those in the art and are selected in accordance with the amount of ammonium sulfate to be retained in the aqueous medium for recycle to the reactor.

The invention is illustrated with reference to the attached drawing, Figure 1, which is a schematic showing of one form of continuous process of this invention.

With reference to Figure 1, hydroxylamine sulfate dissolved in aqueous ammonium sulfate, containing for example 36 weight percent ammonium sulfate, is fed to reaction chamber A via line 1. Cyclohexanone, in an amount stoichiometrically equivalent to the amount of hydroxylamine sulfate in line 1 for reacting with the latter to form cyclohexanone oxime, is fed via line 2 to reaction chamber A. The reaction mixture in chamber A, by stirring means $b$, is agitated at room temperature, or preferably at a somewhat higher temperature such as from 100° to 150° F., so as to maintain all reaction products in solution. Under these conditions hydroxylamine sulfate reacts with cyclohexanone to form soluble cyclohexanone oxime sulfate. Total reaction mixture, i. e., cyclohexanone oxime sulfate dissolved in aqueous ammonium sulfate is withdrawn from chamber A via line 3 and passed into neutralizing and separating zone B, the latter maintained at a temperature slightly above the melting point of cyclohexanone oxime. Ammonia is supplied to neutralizing and separating zone B by way of line 5 and therein reacts to neutralize the cyclohexanone oxime sulfate forming cyclohexanone oxide and ammonium sulfate. Molten cyclohexanone oxime is immiscible with the ammonium sulfate solution (aqueous medium) and separates in zone B as an upper layer in high purity and in substantially complete yield. Molten cyclohexanone oxide is withdrawn from zone B via line 4 as product of the process. Aqueous ammonium sulfate layer, substantially free from oxime product by virtue of the complete salting out effect of the ammonium sulfate on the oxime, is now concentrated above the original concentration, i. e., initially introduced into chamber A via line 1, which additional ammonium sulfate is removed prior to recycling the aqueous medium to chamber A. Accordingly, aqueous ammonium sulfate solution is withdrawn from zone B via line 6 and passed to precipitator or cooler C wherein the ammonium sulfate solution is cooled to a temperature and maintained for a time at that temperature such that the ammonium sulfate formed during neutralization in excess, as described hereinabove, is precipitated from the solution. Precipitated ammonium sulfate is separated from chamber C by way of line 7. Any suitable means for separation of precipitated ammonium sulfate in chamber C can be employed, such as a rotary filter. Aqueous ammonium sulfate containing ammonium sulfate, in a concentration about the same as that initially introduced into chamber A via line 1, is withdrawn from chamber C via line 8 and passed into line 1 for reuse in chamber A. Ammonium sulfate solution is withdrawn through line 9 in a quantity equivalent to the amount of water produced during the oxime formation.

The amount of ammonium sulfate which is precipitated, e. g., in chamber C, can be controlled by the temperature to which the solution is cooled and the length of time during which the solution is allowed to stand. These conditions are selected so as to yield an ammonium sulfate solution of a concentration desired for reuse in a batch operation or for recycle in a continuous operation. In general, the lower the temperature and the longer the period of time, the greater the precipitation.

If desired, vessel A of Figure 1 can constitute a tube or pipe, baffled so as to provide turbulent flow of reactants therethrough, i. e., to facilitate contact of reactants. Oxime formation takes place in the tube and resulting reaction mixture is passed to neutralization, and subsequent phase separation and product recovery.

It is to be understood that although we have illustrated our invention with reference to Figure 1 in terms of formation of a molten oxime product layer and with specific reference to formation of cyclohexanone oxime, our invention can be conducted in reacting any ketone with hydroxylamine sulfate or hydroxylamine acid sulfate in the presence of a regulated amount of sulfate to effect salting out of product.

Although, as described hereinabove, it is now preferred to employ gaseous ammonia as a neutralizing agent in the practice of this invention, aqueous methylamine of a concentration of from 20 to 40 weight percent, or concentrated ammonium hydroxide can be used. However, when employing these aqueous reagents, care must be taken to not introduce too great an amount of diluent in the reaction mixture in view of the adverse effect of too high a degree of dilution on ammonium sulfate precipitation. However, in the event that it is desired to employ an aqueous neutralizing agent, the withdrawn aqueous phase can be concentrated by means other than temperature lowering as, for example, by evaporation.

Although this invention is advantageously applied to production of any oxime by reaction of a ketone with hydroxylamine sulfate and/or hydroxylamine acid sulfate, the invention in a preferred form is applied to reactions of cyclo ketones to produce such as cyclopentanone oxime, methylcyclohexanone oxime and oximes of other alicyclic ketones of relatively low solubility in water.

In accordance with one form of the process of this invention, the ketone-hydroxylamine sulfate and/or hydroxylamine acid sulfate reaction is carried on in a suitable solvent chemically inert to materials in that system. Thus, in accordance with one embodiment, the ketone reactant is dissolved in a suitable solvent such as dichloroethane prior to contacting the ketone with hydroxylamine sulfate and/or hydroxylamine acid sulfate in aqueous solutions of ammonium sulfate containing from about 18 percent ammonium sulfate by weight to saturation concentration at the reaction temperature, although, as disclosed herein, concentrations of ammonium sulfate outside this range can be employed. The solvent-oxime layer, subsequent to neutralization, separates as high purity product and without further treatment to remove solvent can be advantageously charged to a unit for conversion of oxime to a lactam in accordance with the well-known Beckmann rearrangement, the latter taking place in the presence of highly concentrated sulfuric acid, or oleum. The inert solvent employed in this manner is additionally advantageous in that it serves as a means of removing exothermic heat generated during the rearrangement reaction described. When so utilized, the solvent can be employed as a total refluxing liquid, thereby transferring the heat to an overhead condenser. Inert solvent can very conveniently be recovered from the rearrangement step and recycled to the oxime-forming reaction as desired. In another embodiment, a solvent which is miscible with both phases, such as an alcohol, can be employed.

Our invention is illustrated by way of the following examples.

Cyclohexanone was reacted with hydroxylamine acid sulfate to form cyclohexanone oxime, in a manner illustrative of our continuous process. Three runs were carried out in an aqueous solution of ammonium sulfate using the following procedure. A saturated aqueous solution of ammonium sulfate (saturated at 25° C.) was prepared, and 500 ml. (625 grams) of this ammonium sulfate solution was added to a separatory funnel with 50 grams of cyclohexanone (redistilled, $n_D^{20}$ 1.4505) and 44.0 grams of 95 percent by weight hydroxylamine acid sulfate. The mixture was shaken for 15 minutes and then neutralized with anhydrous ammonia to pH 7.0 (±0.3). The resulting mixture was then heated to 72° C. and the aqueous phase separated. The separated aqueous phase was then chilled to 25° C., at which temperature the solution was allowed to stand for 30 minutes. The crystals of ammonium sulfate which precipitated out as a result of the cooling were filtered off and dried at 100° C. without washing. The molten oxime layer which was separated from the aqueous layer previously was then allowed to cool and melting point determinations were run. The aqueous phase was cycled to the oxime-forming reaction zone. The results of several runs carried out in this manner are set forth in the following tabulation:

methylamine sulfate in the reaction zone at all times in a sufficient and proper concentration to cause salting out of molten oxime product in high purity and yield, on a continuous flow basis.

One skilled in this art, in possession of the foregoing disclosure, will understand the invention to be preeminently suited to recovery of an exceptionally pure product. Thus, the separation of the product in molten state permits avoiding the occlusion of mother liquor and other impurities which are unavoidably obtained in the ususal filtering operations. Furthermore, it is clear that, according to the invention, much time is saved by separating the oxime and mother liquor as liquids from each other rather than by employing a filtering operation in which the oxime is separated as a solid from the mother liquor.

It is within the scope of the present invention to so conduct the reaction, on a cyclic basis that upon cooling of the mother liquor after the molten oxime has been separated therefrom, it will be cooled sufficiently to cause separation of sufficient ammonium sulfate and/or methylamine sulfate to provide a recycled mother liquor having a controlled concentration of at least one of the said sulfates such that the completion of the reaction is carried out in the presence of a concentration of at least one of said sulfates which is controlled to a value somewhat below saturation to enable rapid and initimate contact of the reactants to take place. Thus, for example, the mother liquor upon separation of the molten oxime can be cooled to below the reaction temperature employed upon adding additional reactants to the mother liquor for a further cycle of operation. In this manner the mother liquor will not be saturated even at the beginning of the said cycle. Or, if the temperature of initial reaction of the said cycle is substantially that to which the mother liquor has been cooled, the temperature of the mass can be allowed to rise immediately or can be made to rise immediately to arrive at the said concentration.

As a feature of this invention, it will be noted that the controlled concentration of at least one of the sulfates mentioned can be maintained even if means other than separation in molten state of the oxime are employed. Thus, in the event that it is not desired to heat sufficiently

| Test No. | Sat. $(NH_4)_2SO_4$ | Cyclohexanone | HAS 95% | Agitation time, min. | $(NH_4)_2SO_4$ crystallization | | $(NH_4)_2SO_4$ [1] | | Oxime [1] | | M. P., °C. |
|---|---|---|---|---|---|---|---|---|---|---|---|
| | | | | | Time, min. | Temp., °C. | Grams | Percent theo. | Grams | Percent theo. | |
| 1 | 500 ml, 625 g | 50 | 44.0 | 15 | 30 | 25 | 32.5 | 97.5 | 56.7 | 98.2 | 87.5–89 |
| 2 | 500 ml, 625 g | 50 | 44.0 | 15 | 30 | 25 | 33.0 | 98.0 | 57.4 | 99.3 | 87.5–89 |
| 3 | 500 ml, 625 g | 50 | 44.0 | 15 | 30 | 25 | 33.1 | 98.3 | 57.0 | 98.8 | 87.5–89 |

[1] Theoretical is 33.7 g. $(NH_4)_2SO_4$, 57.7 g. oxime.

This example is illustrative of one form of our continuous process for making oximes wherein ketone and hydroxylamine sulfate and/or hydroxylamine acid sulfate reactants are reacted in presence of a sufficient amount of ammonium sulfate or methylamine sulfate to cause salting out of high purity molten oxime product, neutralizing resulting reaction mixture with ammonia or methylamine, whereby additional ammonium or methylamine sulfate is formed, heating the resulting reaction mixture to at least the fusion temperature of the oxime therein, whereby an upper layer of molten oxime of high purity separates, recovering molten oxime product, withdrawing resulting aqueous phase from the reaction zone, cooling withdrawn aqueous phase to remove about that amount of ammonium or methylamine sulfate formed during neutralization and cycling residual aqueous phase to the reaction zone with additional ketone and hydroxylamine sulfate or hydroxylamine acid sulfate reactants. The cycling of the residual aqueous phase, as described, to the reaction zone is an important feature of this invention, as it provides for the presence of ammonium and/or to remove the oxime in molten state, which is the now preferred form of the invention, then it will be obvious to one in possession of this disclosure that the operation can still be effected on a cyclic basis by removing some of the sulfate, as herein set forth and described, intermediate successive reaction steps.

Reasonable variation and modification are possible within the scope of the foregoing disclosure, drawings, and the appended claims to the invention, the essence of which is that a ketone is reacted with at least one of hydroxylamine sulfate and hydroxylamine acid sulfate to form an oxime, in the presence of a sufficient concentration of ammonium sulfate and/or methylamine sulfate to cause substantially complete salting out of molten oxime product; resulting reaction mixture is neutralized with ammonia or methylamine, or both, whereby a corresponding sulfate is formed; molten oxime product is recovered from the resulting reaction mixture; and the said concentration of ammonium sulfate and/or methylamine sulfate in the reaction mixture is maintained, in a now preferred embodiment, by withdrawing aqueous non-product phase, removing sulfate therefrom that is formed during the neutralization, as by cooling, and cycling to the reaction zone residual non-product phase containing ammonium sulfate and/or methylamine sulfate in a concentration substantially the same as that initially introduced into the reaction zone, together with newly added oxime-forming reactants; all as described herein.

We claim:

1. A process comprising reacting an alicyclic mono-ketone with a hydroxylamine reactant selected from the group consisting of hydroxylamine sulfate and hydroxylamine acid sulfate to form an oxime product in presence of a sufficient amount of a sulfate-containing compound selected from the group consisting of ammonium sulfate and methylamine sulfate to cause salting out of molten oxime product; neutralizing resulting reaction mixture with a neutralizing agent selected from the group consisting of methylamine and ammonia whereby said sulfate-containing compound is formed; separating oxime product from the resulting reaction mixture at a temperature at which said oxime product is molten to recover said oxime product and a non-product phase; adjusting the concentration of said sulfate-containing compound in said non-product phase so as to cause substantially complete salting out of high purity molten oxime product; and introducing additional amounts of said alicyclic mono-ketone and said hydroxylamine reactant into said non-product phase to form additional oxime product.

2. A process of claim 1 wherein said hydroxylamine reactant is aqueous hydroxylamine sulfate and wherein said neutralizing agent is methylamine.

3. A process of claim 1 wherein said hydroxylamine reactant is aqueous hydroxylamine acid sulfate and wherein said neutralizing agent is ammonia.

4. A process of claim 1 wherein reaction of said alicyclic mono-ketone and said hydroxylamine reactant is in aqueous medium, wherein ammonia is employed as the neutralizing agent, and wherein the concentration of ammonium sulfate in the aqueous medium is from about 18 weight percent to saturation, at reaction temperature.

5. A process comprising reacting an alicyclic mono-ketone with at least a stoichiometric proportion of hydroxylamine sulfate to form oxime product in the presence of a sufficient amount of aqueous ammonium sulfate to cause substantially complete salting out of said oxime product when in molten state, neutralizing the resulting reaction mixture with ammonia and heating the neutralized reaction mixture to a temperature at least as high as the fusion point of said oxime product therein, separating molten oxime product from an aqueous layer of the resulting reaction mixture, removing ammonium sulfate from said resulting aqueous layer to provide a residual aqueous layer containing ammonium sulfate in a concentration not exceeding that initially present during said reacting to form said oxime product, cycling resulting residual aqueous layer to the zone of said alicyclic mono-ketone-hydroxylamine sulfate reaction together with additional alicyclic mono-ketone and hydroxylamine sulfate reactants to effect continued oxime formation.

6. A process comprising reacting cyclohexanone with at least a stoichiometric proportion of hydroxylamine sulfate to form cyclohexanone oxime in the presence of a sufficient amount of aqueous ammonium sulfate to cause substantially complete salting out of oxime product when in molten state, neutralizing the resulting reaction mixture with ammonia and heating the neutralized reaction mixture to a temperature at least as high as the fusion point of oxime product therein, separating molten oxime product from an aqueous layer of the resulting reaction mixture, cooling resulting aqueous layer sufficiently to cause separation of ammonium sulfate crystals therefrom in an amount providing a residual aqueous layer containing ammonium sulfate in a concentration not exceeding that initially present during said reacting to form said cyclohexanone oxime, cycling resulting residual aqueous layer to the zone of said cyclohexanone-hydroxylamine sulfate reaction together with additional cyclohexanone and hydroxylamine sulfate reactants to effect continued oxime formation.

7. A process of claim 6 wherein said hydroxylamine sulfate is dissolved in aqueous ammonium sulfate containing at least 18 weight percent ammonium sulfate, wherein about a stoichiometric equivalent of cyclohexanone is added to the resulting ammonium sulfate-hydroxylamine sulfate solution to form said oxime, wherein resulting two-phase ketone-hydroxylamine reaction mixture is agitated at a temperature below the fusion temperature of oxime to be formed until a single phase is formed and ammonia is added to the resulting single phase mixture in an amount sufficient to neutralize cyclohexanone oxime sulfate therein.

References Cited in the file of this patent

UNITED STATES PATENTS

| 2,249,177 | Schlack | Nov. 27, 1939 |
| 2,283,150 | Schlack | Nov. 27, 1939 |

FOREIGN PATENTS

| 561,403 | Great Britain | May 18, 1944 |
| 677,386 | Great Britain | Aug. 13, 1952 |
| 1,077,987 | France | May 5, 1954 |